(12) United States Patent
Guo et al.

(10) Patent No.: US 10,581,066 B2
(45) Date of Patent: Mar. 3, 2020

(54) LITHIUM SULFIDE ELECTRODE AND METHOD

(71) Applicant: The Regents of the University of California, Oakland, CA (US)

(72) Inventors: Juchen Guo, Anaheim, CA (US); Noam Hart, Moreno Valley, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 15/752,496

(22) PCT Filed: Aug. 15, 2016

(86) PCT No.: PCT/US2016/046868
§ 371 (c)(1),
(2) Date: Feb. 13, 2018

(87) PCT Pub. No.: WO2017/027831
PCT Pub. Date: Feb. 16, 2017

(65) Prior Publication Data
US 2018/0277833 A1    Sep. 27, 2018

Related U.S. Application Data

(60) Provisional application No. 62/204,871, filed on Aug. 13, 2015.

(51) Int. Cl.
*H01M 4/1397* (2010.01)
*C01B 17/28* (2006.01)
(Continued)

(52) U.S. Cl.
CPC .......... *H01M 4/1397* (2013.01); *C01B 17/28* (2013.01); *C01B 32/05* (2017.08); *H01M 4/133* (2013.01);
(Continued)

(58) Field of Classification Search
CPC .... H01M 4/1397; H01M 4/133; H01M 4/136; H01M 4/1393; H01M 4/364;
(Continued)

(56) References Cited

U.S. PATENT DOCUMENTS

| 4,126,666 A | 11/1978 | Jacob et al. |
| 2014/0322612 A1 | 10/2014 | Wietelmann et al. |

FOREIGN PATENT DOCUMENTS

| CN | 108028363 A | 5/2018 |
| KR | 1020180038548 | 4/2018 |

(Continued)

OTHER PUBLICATIONS

International Application Serial No. PCT/US2016/046868, International Search Report and Written Opinion dated Oct. 25, 2016, 9 pgs.

(Continued)

*Primary Examiner* — Jayne L Mershon
(74) *Attorney, Agent, or Firm* — Schwegman Lundberg & Woessner, P.A.

(57) ABSTRACT

A lithium-sulfide-carbon composite and methods are shown. In one example, the lithium-sulfide-carbon composites are used as an electrode in a battery, such as a lithium ion battery.

18 Claims, 9 Drawing Sheets

(51) Int. Cl.
- *C01B 32/05* (2017.01)
- *H01M 4/1393* (2010.01)
- *H01M 4/36* (2006.01)
- *H01M 4/58* (2010.01)
- *H01M 4/587* (2010.01)
- *H01M 10/0525* (2010.01)
- *H01M 4/133* (2010.01)
- *H01M 4/136* (2010.01)
- *H01M 4/02* (2006.01)

(52) U.S. Cl.
CPC ........ *H01M 4/136* (2013.01); *H01M 4/1393* (2013.01); *H01M 4/364* (2013.01); *H01M 4/366* (2013.01); *H01M 4/587* (2013.01); *H01M 4/5815* (2013.01); *H01M 10/0525* (2013.01); *C01P 2004/80* (2013.01); *C01P 2006/40* (2013.01); *H01M 2004/028* (2013.01)

(58) Field of Classification Search
CPC .... H01M 4/366; H01M 4/5815; H01M 4/587; H01M 10/0525; C01B 32/05; C01B 17/28
See application file for complete search history.

(56) References Cited

FOREIGN PATENT DOCUMENTS

WO    WO 2014 074150    *   5/2014
WO    WO-2015103305 A1    7/2015

OTHER PUBLICATIONS

European Application Serial No. 16754122.6, Communication Pursuant to Article 94(3) EPC dated Dec. 21, 2018, 6 pgs.
European Application Serial No. 16754122.6, Response filed Apr. 30, 2019 to Communication Pursuant to Article 94(3) EPC dated Dec. 21, 2018, 12 pgs.
European Application Serial No. 16754122.6, Response filed Oct. 1, 2018 to Communication pursuant to Rules 161(1) and 162 EPC dated Mar. 20, 2018, 10 pgs.
Japanese Application Serial No. 2018-507600, Voluntary Amendment filed Aug. 8, 2019, w/ English Claims, 7 pgs.
"International Application Serial No. PCT US2016 046868, International Preliminary Report on Patentability dated Feb. 22, 2018", 8 pgs.

* cited by examiner

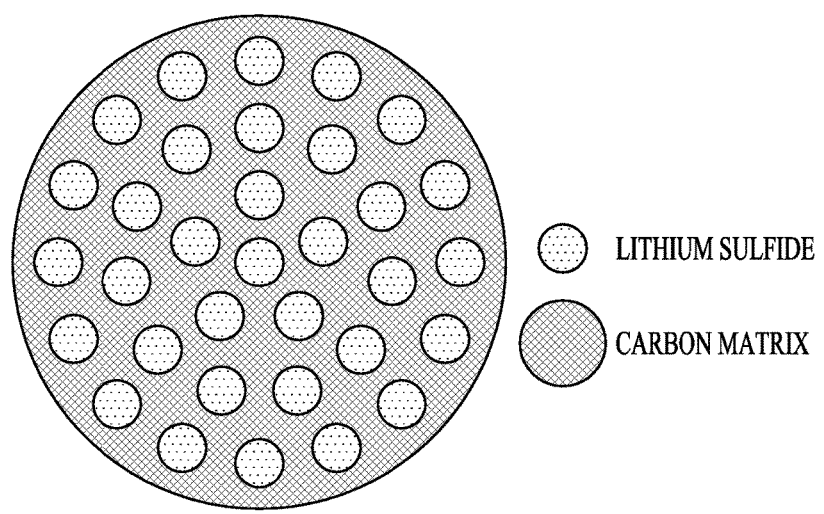
*FIG. 4*
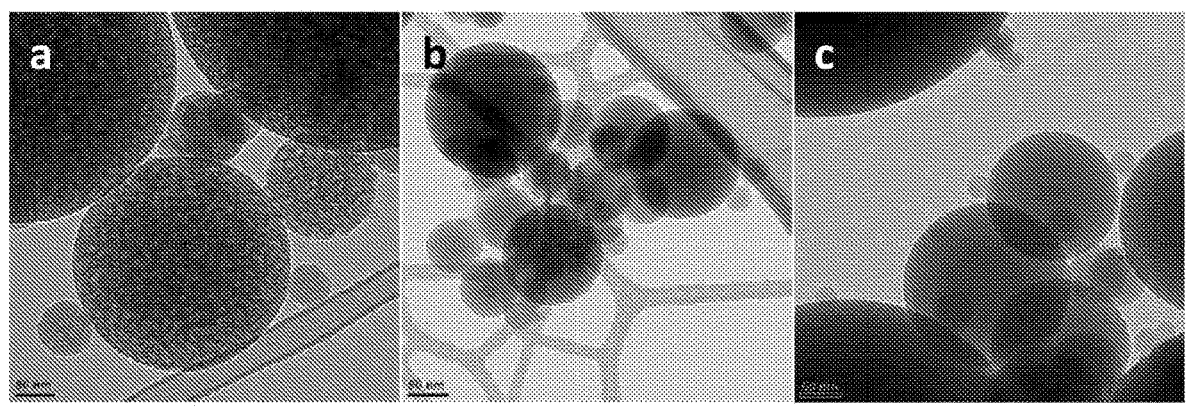
*FIG. 5A*  *FIG. 5B*  *FIG. 5C*

LITHIUM SULFIDE ELECTRODE AND METHOD

RELATED APPLICATION

This application is a U.S. National Stage Filing under 35 U.S.C. 371 from International Application No. PCT/US2016/046868, filed on Aug. 12, 2016, and published as WO 2017/027831 A1 on Feb. 16, 2017 which claims priority to U.S. Provisional Patent Application No. 62/204,871, entitled "LITHIUM SULFIDE ELECTRODE AND METHOD," filed on Aug. 13, 2015, each of which is incorporated herein by reference in its entirety.

TECHNICAL FIELD

This invention relates to materials for battery electrodes, and in particular to materials for battery electrodes containing lithium sulfide and methods thereof. In one example, this invention is related to lithium-sulfide carbon composites.

BACKGROUND

The invention of rechargeable lithium-ion (Li-ion) battery technology has set the standard in energy storage over the last several decades for powering portable phones, computers, and electric vehicles. While the demand for devices that provide faster data communication, increased computational power, brighter and higher resolution displays, and batteries with longer ranges, better performances, shorter charging times, at reduced weight and lower cost has increased over that time, the capability and development of lithium-ion batteries has not kept pace with this increase in demand.

As limitations of current Li-ion battery technology becomes more apparent, the need for alternative rechargeable battery technologies becomes more critical. One example of an attractive alternative to the current Li-ion battery technology is lithium-sulfur (Li—S) battery technology because of its potential for higher energy capacity and cost reduction from the use of sulfur. Most Li-ion batteries have energy capacity in the range of 150 to 250 Wh/kg, while Li—S batteries may offer energy capacity of 400+ Wh/kg. Therefore, Li—S batteries can have higher cell-level (and pack-level) capacity than current Li-ion batteries.

However, there is currently a lack of Li—S batteries that are commercially available due to many well-known technical challenges. One of the primary shortfalls of most Li—S cells is unwanted reactions with the electrolytes as dissolving intermediate polysulfides into electrolytes cause irreversible loss of active sulfur.
Another issue is the widespread use of sulfur-based cathode material that necessitates the use of lithium metal anode as the source for lithium for Li—S batteries. Lithium metal anode can be prone to dendrite growth that can cause thermal runaway due to internal short circuit of the battery. Further, using lithium anode, and in particular to Li—S batteries, can lead to undesirable side reactions as the polysulfide diffuses back and forth between the electrodes in a phenomenon known as the shuttle mechanism, which reduces the charge-discharge efficiency and cycle stability due to lithium corrosion and sulfur oxidation. Moreover, using lithium metal is not cost-effective, since commercial lithium anodes (typically Li thin foils) require sophisticated processes (purification, extrusion, passivation, etc.) because lithium is very active towards moisture and air (oxygen and nitrogen).

The present disclosure provides a solution to these problems by using a continuous and scalable aerosol spray pyrolysis (ASP) process to form lithium-sulfide-carbon composites, which can be a superior cathode material as compared to sulfur because the resulting structure of the material mitigates capacity fading due to the loss of active sulfur material. Further, when using lithium-sulfide as the cathode material, non-lithium high-capacity anode materials such as tin based materials and silicon based materials can be used in the lithium sulfur cell. Therefore, using the lithium-sulfide cathode material as described herein can also minimize or prevent the aforementioned disadvantages associated with the use of lithium metal anode.

Other possible approaches for synthesizing lithium sulfide may not be as scalable or provide the rationally designed structure of the material for the desired functionality. For example, lithium sulfide has been synthesized by ball-milling lithium sulfide and carbon as well as lithiation of conventional sulfur cathode materials. However, the lithium-sulfide cathode material of the present disclosure can provide a superior material for use in a battery (e.g., Li-ion, Li—S, etc.) as compared to the previous approaches. For example, since the ASP process allows the lithium sulfide to be more uniformly dispersed within the carbon matrix, the kinetics of charge transfer process can be improved to result in improved rate capability (the capacity to be discharged and charged at a faster rate). The uniform lithium sulfide dispersion in the carbon matrix can also effectively sequestrate the dissolution of lithium polysulfides thus alleviating the shuttle mechanism.

To better illustrate the encapsulated method and systems disclosed herein, a non-limiting list of examples is provided here:

Example 1 can include subject matter (such as a method) for forming a battery electrode. The method can include forming a precursor solution including a lithium sulfide precursor and a carbon precursor; converting the precursor solution into an aerosol; removing water from the aerosol to form precursor particles; reacting the precursor particles at a first reaction temperature to form lithium carbonate; and reacting the lithium carbonate with hydrogen sulfide to form a lithium-sulfide-carbon composite.

In Example 2, the subject matter of Example 1 can optionally be configured to include shaping an amount of the lithium-sulfide-carbon composite into an electrode.

In Example 3, the subject matter of any one or any combination of Examples 1 or 2 can optionally be configured to include where the lithium sulfide precursor is selected from lithium nitrate, lithium acetate, and lithium carbonate.

In Example 4, the subject matter of any one or any combination of Examples 1 through 3 can optionally be configured where the carbon precursor is selected from sucrose, glucose, and polyvinylpyrrolidone.

In Example 5, the subject matter of any one or any combination of Examples 1 through 4 can optionally be configured where the lithium sulfide precursor is lithium nitrate and the carbon precursor is sucrose.

In Example 6, the subject matter of any one or any combination of Examples 1 through 5 can optionally be configured where the lithium sulfide precursor is lithium acetate and the carbon precursor is sucrose.

In Example 7, the subject matter of any one or any combination of Examples 1 through 6 can optionally be configured where the lithium sulfide precursor is lithium acetate and the carbon precursor is sucrose.

In Example 8, the subject matter of any one or any combination of Examples 1 through 7 can optionally be configured where the lithium-sulfide-carbon composite includes about 50 volume percent to about 65 volume percent of lithium sulfide.

In Example 9, the subject matter of any one or any combination of Examples 1 through 8 can optionally be configured where the precursor particles have a water content of less than 20 percent.

In Example 10, the subject matter of any one or any combination of Examples 1 through 9 can optionally be configured where reacting the lithium carbonate with hydrogen sulfide includes reacting the lithium carbonate with hydrogen sulfide at a second temperature in a gaseous environment including an inert gas an hydrogen sulfide, wherein the second temperature less than the first temperature.

In Example 11, the subject matter of any one or any combination of Examples 1 through 10 can optionally be configured to include forming the gaseous environment.

In Example 12, the subject matter of any one or any combination of Examples 1 through 11 can optionally be configured where forming the gaseous environment including flowing argon and hydrogen over elemental sulfur.

Example 13, can include subject matter (such as a method) for forming a battery. The method can include obtaining or providing a first electrode, including: a lithium-sulfide-carbon composite formed by an aerosol spray pyrolysis process, wherein a plurality of lithium-sulfide particles are at least 70 weight percent of the electrode; obtaining or providing a second non-lithium containing electrode; and contacting an electrolyte with both the first electrode and the second non-lithium containing electrode.

In Example 14, the subject matter of any one or any combination of Examples 1 through 13 can optionally be configured to include forming the first electrode, including: forming a precursor solution including a lithium sulfide precursor and a carbon precursor; converting the precursor solution into an aerosol; removing water from the aerosol to form precursor particles; reacting the precursor particles at a first reaction temperature to form lithium carbonate; and reacting the lithium carbonate with hydrogen sulfide to form a lithium-sulfide-carbon composite.

In Example 15, the subject matter of any one or any combination of Examples 1 through 14 can optionally be configured where the lithium sulfide precursor is selected from lithium nitrate, lithium acetate, and lithium carbonate and the carbon precursor is selected from sucrose, glucose, and polyvinylpyrrolidone.

In Example 16, the subject matter of any one or any combination of Examples 1 through 15 can optionally be configured where the second electrode includes at least one of tin and silicone.

In Example 17, the subject matter of any one or any combination of Examples 1 through 16 can optionally be configured where the battery is a CR2032 form factor.

Example 18 can include an electrode including a carbon matrix; and a plurality of lithium-sulfide particles uniformly distributed into the carbon matrix, wherein the plurality of lithium-sulfide particles are about 70 weight percent of the electrode.

In Example 19, the subject matter of any one or any combination of Examples 1 through 18 can optionally be configured where the plurality of lithium particles are uniformly distributed into the carbon matrix via an aerosol spray pyrolysis process such that per one gram of carbon includes lithium-sulfide particles within the range of about 1 gram to about 2.5 grams.

Example 20 can include a battery. The battery includes a first electrode, including a plurality of lithium-sulfide particles coated with a carbon shell, a second electrode, and an electrolyte in contact with both the first electrode and the second electrode.

Example 21 can include the battery of example 20, wherein the plurality of lithium-sulfide particles coated with a carbon shell include a plurality of lithium-sulfide particles coated with an amorphous carbon shell.

Example 22 can include the battery of any one of examples 20-21, wherein the plurality of lithium-sulfide particles are about 70 weight percent of the electrode.

Example 23 can include the battery of any one of examples 20-22, wherein the plurality of lithium particles are uniformly distributed via an aerosol spray pyrolysis process such that per one gram of carbon includes lithium-sulfide particles within the range of about 1 gram to about 2.5 grams.

BRIEF DESCRIPTION OF THE DRAWINGS

FIG. 4 shows an illustration of the lithium-sulfide-carbon composite according to one example of the present disclosure.

FIG. 5A shows a transmission electron microscopy (TEM) image of the lithium-sulfide-carbon composite according to one example of the present disclosure.

FIG. 5B shows a TEM image of the lithium-sulfide-carbon composite according to one example of the present disclosure.

FIG. 5C shows a TEM image of the lithium-sulfide-carbon composite according to one example of the present disclosure.

DETAILED DESCRIPTION

Figure 1:
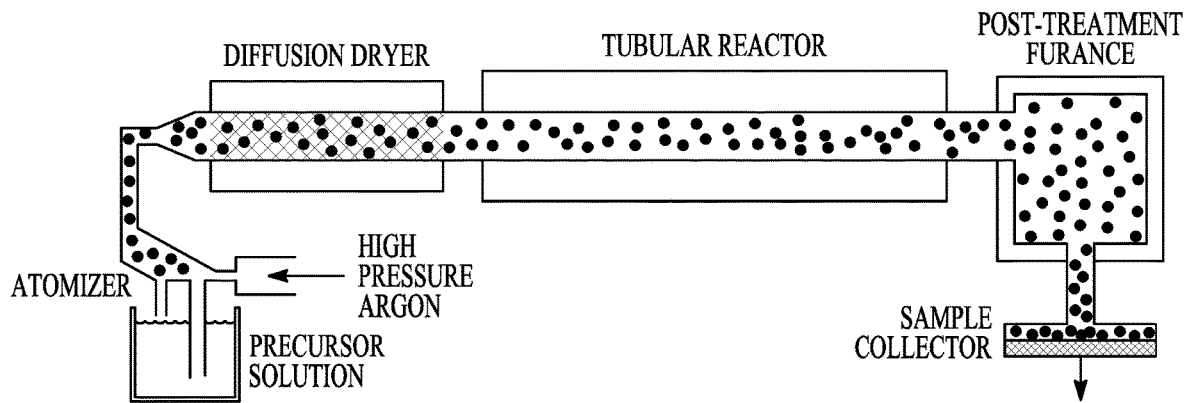
FIG. 1 shows a diagram of an aerosol spray pyrolysis (ASP) process according to one example of the present disclosure.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Lithium-sulfide-carbon ($Li_2S$—C) composites are shown fabricated via an aerosol spray pyrolysis (ASP) process. The ASP process provides the $Li_2S$—C composite material with rationally designed structures and desirable functionality.

Figure 2:
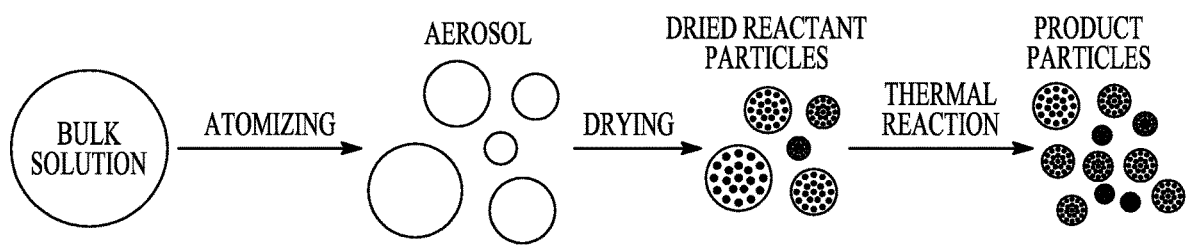
FIG. 2 shows a diagram of an ASP process according to one example of the present disclosure.

FIGS. 1 and 2 show diagrams illustrating an example of the ASP process. The ASP process as shown in FIG. 1 is a continuous process/setup composed of four major components including: (1) an atomizer, (2) a diffusion dryer, (3) a tubular reactor for thermolysis reactions, and (4) a reactor for post-treatments.

In an example, the ASP process can start with atomization of a homogenous solution of precursors through the atomizer. The precursors, i.e. the reactants to synthesize the $Li_2S$—C composites, can include carbon precursors and $Li_2S$ precursors. Three examples of lithium salts including lithium nitrate ($LiNO_3$), lithium carbonate ($Li_2CO_3$), and lithium acetate ($CH_3COOLi$) are used as the $Li_2S$ precursors. In an example, the carbon precursors can be selected from sucrose, glucose, starch, and polyvinylpyrrolidone.

The atomizer can generate an aerosol of the precursor solution. As used herein, "aerosol" or "aerosol droplets" are defined as a colloidal suspension of particles dispersed in a gas. The generated aerosol (small droplets of the precursor solution) from the atomizer is carried by inert gas through the diffusion dryer to remove the water content. In one example, argon is used as the inert gas. However, other inert gases can be used as well. As shown in FIG. 2, the bulk solution of the precursor solution can go through atomizer such that an aerosol of the precursor solution is formed.

After forming the aerosol, the aerosol can go through the diffusion dryer. In an example, the diffusion dryer can include silica gel as an absorbing agent and can operate at, for example, 700 degrees Celsius (° C.). However, other absorbing agents can be used and the diffusion dryer can operate at other temperatures. In an example, the diffusion dryer can remove water within a range of about 60 percent (%) to about 80%.

Figure 3:
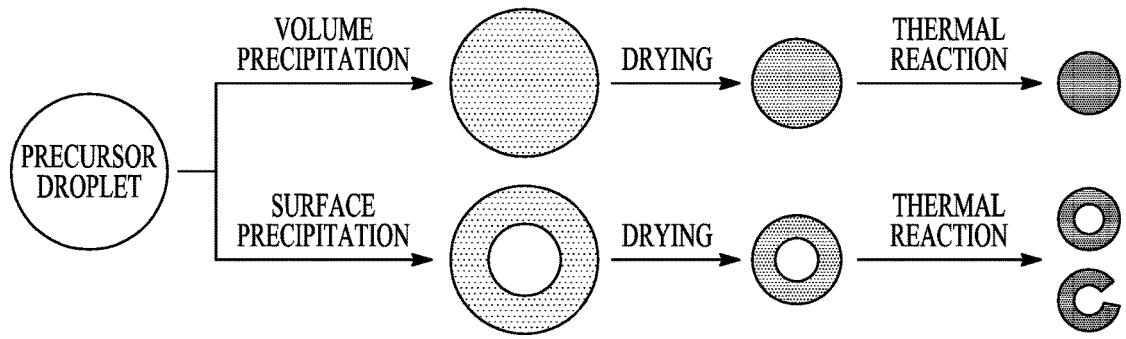
FIG. 3 shows a diagram of an ASP process according to two types of precipitations.

FIG. 3 shows a diagram of an ASP process according to two types of precipitations. During the drying process occurring in the diffusion dryer, the solutes (e.g., reactants Li salts and sucrose) are precipitated into solid precursor particles. Two types of precipitations, volume precipitation and surface precipitation, can occur to lead to different particle structures depending on the relative solubility of the reactants. For the ASP processes of the present disclosure, volume precipitation can occur, i.e. the reactants (Li salts and sucrose) precipitate simultaneously and homogeneously to result in homogeneous mixture. The subsequent thermal reaction can enable Li salts decomposition and carbonization to result in a homogeneous structure with uniform dispersion and carbon encapsulation.

The resulting solid precursor particles are sequentially carried into the tubular furnace reactor (hereinafter "tubular reactor"), in which a variety of reactions are thermally induced. The uniqueness of the ASP process is that the precursors are mixed very uniformly in the small particles, which can be considered individual micro-reactors. The small particle size of the particles (e.g., tens to hundreds of nanometers) can ensure fast intra-particle reactions in the reactor. Additionally, desired microstructures can be achieved by manipulating the precursor compositions and the ASP processing parameters.

As discussed herein, the precursor solution can include the precursors $LiNO_3$ and sucrose, $CH_3COOLi$ and sucrose, or $Li_2CO_3$ and sucrose. In an example, the precursor solution can include 0.15 M $LiNO_3$ and 0.15 M sucrose, 0.15 M $CH_3COOLi$ and 0.15 M sucrose, or 0.075 M $Li_2CO_3$ and 0.15 M sucrose in water, respectively. In an example when $LiNO_3$ and sucrose are used, the $LiNO_3$ precursor can have a concentration within a range of from about 0.1 M to about 1M, for example, 0.1 M to 0.5 M such as 0.1 M to 0.2 M and the sucrose precursor can have a concentration within a range of about 0.1 M to about 1 M, for example, 0.1 M to 0.5 M such as 0.1 M to 0.2 M. In an example when $CH_3COOLi$ and sucrose are used, the $CH_3COOLi$ concentration can be within a range from about 0.1 M to about 1M, for example, 0.1 M to 0.5 M such as 0.1 M to 0.2 M and the sucrose concentration can be within a range from about 0.05 M to about 0.4 M, for example, 0.05 M to 0.25 M such as 0.05 M to 0.15 M. In an example when $Li_2CO_3$ and sucrose, the $Li_2CO_3$ concentration can be within a range from about 0.02 M to about 0.15 M, for example, 0.02 M to 0.1 M such as 0.02 M to 0.05 M and the sucrose concentration can be within a range from about 0.05 M to about 0.3 M, for example, 0.05 M to 0.2 M such as 0.05 M to 0.15 M.

When $LiNO_3$ and sucrose are used, the following reactions can substantially simultaneously occur in the tubular reactor at a reaction temperature under the inert gas environment:

(Reaction 1)

$$4LiNO_3 \rightarrow 2Li_2O + 4NO_2 + O_2 \quad [1]$$

(Reaction 2)

$$Sucrose \rightarrow C(Li_2O \text{ as catalysts}) \quad [2]$$

(Reaction 3)

$$Li_2O + C + O_2 \rightarrow Li_2CO_3 \quad [3]$$

In Reaction 1, the lithium nitrate can form lithium oxide, nitrogen dioxide, and oxygen and the sucrose can form carbon. The lithium oxide, carbon, and oxygen can react to form lithium carbonate-carbon ($Li_2CO_3$—C) composite, which is the reactor product leaving the tubular reactor. The precursors can be completely consumed during the reactions. Although there might be a small amount of $Li_2O$ in addition to $Li_2CO_3$. In an example, the output of $Li_2CO_3$ can be greater than 85% and the existence of the residual $Li_2O$ will not impair the final product of $Li_2S$ since the subsequent $H_2S$ treatment can also convert $Li_2O$ to $Li_2S$ via the following reaction:

(Reaction 4)

$$Li_2O + H_2S \rightarrow Li_2S + H_2O \quad [4]$$

In an example, the reaction temperature can be within a range from about 600° C. to about 1000° C. In one example, the reaction temperature is about 700° C.

The reactor product, the $Li_2CO_3$—C composite can be collected and sent to a post-treatment reactor to form the final product, the lithium-sulfide-carbon composite. The post post-treatment furnace can be connected directly to the tubular reactor or separated as an individual reactor. In the former, the Li2CO3-C can be collected directly in the post-treatment reactor and in the later, the Li2CO3-C can be collected with a filter collector, and then sent to the post-treatment reactor.

In the post-treatment reactor, the reactor product can further be heated at a post-treatment temperature in a gaseous environment. In an example, the post-treatment temperature can be within a range of about 500° C. to about 700° C. In one example, the post-treatment temperature is 550° C. The gaseous environment can be composed of an inert gas (e.g., argon) and hydrogen sulfide ($H_2S$). In one example, the gaseous environment includes about 99 volume percent (vol. %) to about 95 vol. % of argon and about 1 vol. % to about 5 vol. % of $H_2S$. In one example, the gaseous environment includes about 95 vol. % argon and 5 vol. % $H_2S$. Such an environment can be generated by flowing 95 vol. % and 5 vol. % $H_2$ over elemental sulfur. The following reaction of the $Li_2CO_3$—C composite occurs with $H_2S$:

(Reaction 5)

$$Li_2CO_3 + H_2S \rightarrow Li_2S + CO_2 + H_2O \quad [5]$$

The final product from Reaction 5 can be a $Li_2S$—C composite.

When $CH_3COOLi$ and sucrose are used as the precursors, the following reactions occur in the tubular reactor:

(Reaction 6)

$$2CH_3COOLi \rightarrow Li_2CO_3 + C_3H_6O \text{ (acetone)} \quad [6]$$

(Reaction 7)

Sucrose→C($Li_2CO_3$ as catalysts) [7]

The $Li_2S$—C composite is then produced according to reaction [5].

When $Li_2CO_3$ and sucrose are used as the precursors, $Li_2CO_3$ does not decompose in the reactor, but serves as the catalyst for carbonization from sucrose. The $Li_2S$—C is then produced according to reaction [5].

In an example, the $Li_2S$—C composite can have a lithium sulfide content of about 70 weight percent (wt. %) to about 80 wt. %. As discussed herein, the synthesized $Li_2S$—C composite can have the lithium sulfide more evenly and uniformly dispersed. That is, more of the lithium sulfide can be incorporated into the carbon matrix and increase electrical properties. FIG. 4 illustrates a diagram of the $Li_2S$—C composite and illustrates that the the present disclosure can provide a $Li_2S$—C composite where the lithium sulfide can be more uniformly and evenly dispersed within the carbon matrix.

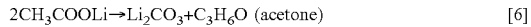

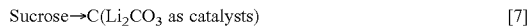

$Li_2S$—C composites using $LiNO_3$, $Li_2CO_3$, and $CH_3COOLi$ and sucrose were formed. To form a $Li_2S$—C composite using $LiNO_3$, 100 grams (g) of 0.3 M $LiNO_3$ and 100 g of 0.3 M sucrose were mixed together to form a precursor solution. The precursor solution was sent to the atomizer of the ASP process to form an aerosol. The aerosol was sent to the diffusion dryer (25° C.) to remove the water content and form precursor particles. The precursor particles were sent to the tubular reactor (700° C.) and the lithium carbonate-carbon ($Li_2CO_3$—C) composite (reactor product) was formed. The reactor product, the $Li_2CO_3$—C was collected and sent to a post-treatment reactor. The reactor product was heated to 550° C. in a gaseous environment including 95 vol. % argon and 5 vol. % $H_2S$ to form the final product ($Li_2S$—C composite).

In another example, 100 g of 0.3 M $CH_3COOLi$ and 100 g of 0.3 M sucrose were mixed together to form the precursor solution. The precursor solution was sent to the atomizer of the ASP process to form an aerosol. The aerosol was sent to the diffusion dryer (25° C.) to remove the water content and form precursor particles. The precursor particles were sent to the tubular reactor (700° C.) and the lithium carbonate-carbon ($Li_2CO_3$—C) composite (reactor product) was formed. The reactor product, the $Li_2CO_3$—C was collected and sent to a post-treatment reactor. The reactor product was heated to 550° C. in a gaseous environment including 95 vol. % argon and 5 vol. % $H_2S$ to form the final product ($Li_2S$—C composite).

In another example, 100 g of 0.15 M $Li_2CO_3$ and 100 g of 0.3 M sucrose were mixed together to form the precursor solution. The precursor solution was sent to the atomizer of the ASP process to form an aerosol. The aerosol was sent to the diffusion dryer (25° C.) to remove the water content and form precursor particles. The precursor particles were sent to the tubular reactor (700° C.) and the lithium carbonate-carbon ($Li_2CO_3$—C) composite (reactor product) was formed. The reactor product, the $Li_2CO_3$—C was collected and sent to a post-treatment reactor. The reactor product was heated to 550° C. in a gaseous environment including 95 vol. % argon and 5 vol. % $H_2S$ to form the final product ($Li_2S$—C composite).

The transmission electron microscopy (TEM) images of the $Li_2S$—C composite particles formed from $LiNO_3$, $Li_2CO_3$, and $CH_3COOLi$ are shown in FIGS. 5A, 5B, and 5C, respectively. The $Li_2S$—C composite particles formed from $LiNO_3$, as shown in FIG. 5A, have a porous structure indicated by the contrast as the lighter spots are pores. The porosity is induced by the gas ($NO_2$ and $O_2$) formation and carbon consumption. The Li2S—C composite particles formed from $Li_2CO_3$ (shown in FIG. 5B) and $CH_3COOLi$ (shown in FIG. 5C) have a homogeneous structure, since there is less or no gas generation. Large $Li_2S$ grains cannot be observed in all three types of particles, indicating the true uniform dispersion. The TEM images were taken using Philips FEI CM300 TEM.

As discussed herein, the performance advantages provided by using the $Li_2S$—C composite of the present disclosure can include minimization, avoidance and prevention of the capacity fading due to irreversible active material loss, dendrite growth and thermal runaway due to internal short circuit, the shuttle mechanism, as well as improvement in charge-discharge efficiency, cycle stability and enabling higher capacity of energy storage at lower material and processing cost. By synthesizing the $Li_2S$—C composite via the ASP process, lithium sulfide can be evenly and uniformly dispersed within the carbon matrix, which can improve the utilization of the active material and mitigate lithium polysulfide dissolution. For example, the Li2S—C composite particles formed from CH3COOLi can have 75 wt. % of $Li_2S$ (FIG. 5C). The TEM image has very uniform structure indicating the $Li_2S$ is very uniformly dispersed in the carbon matrix.

Figure 6A:
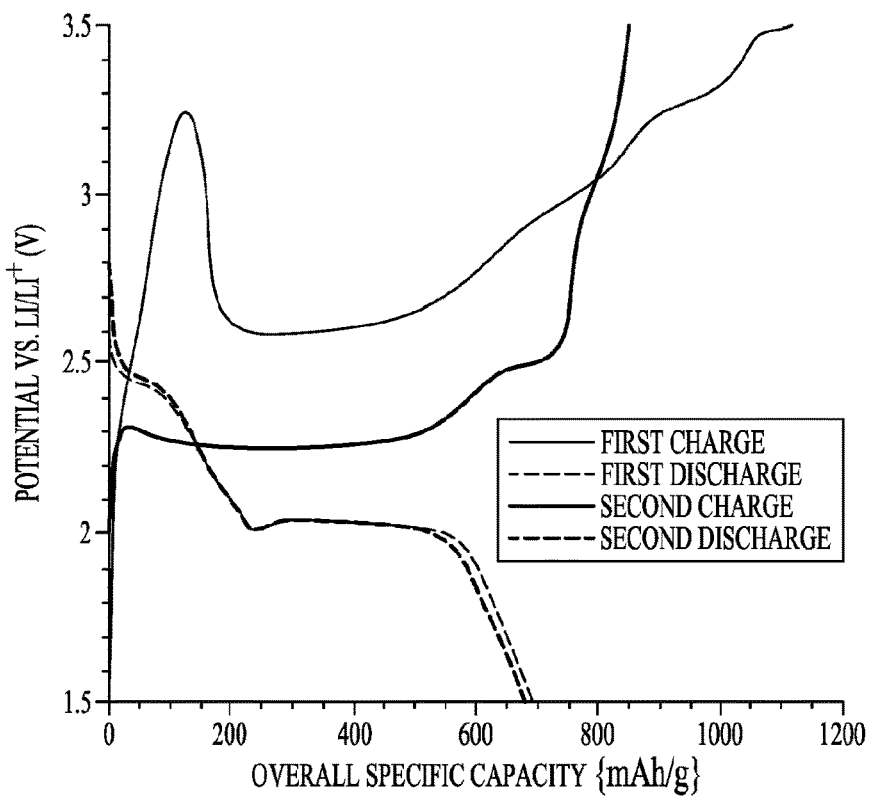
FIG. 6A shows electrical performance data of batteries using particles according to one example of the present disclosure.
Figure 6B:
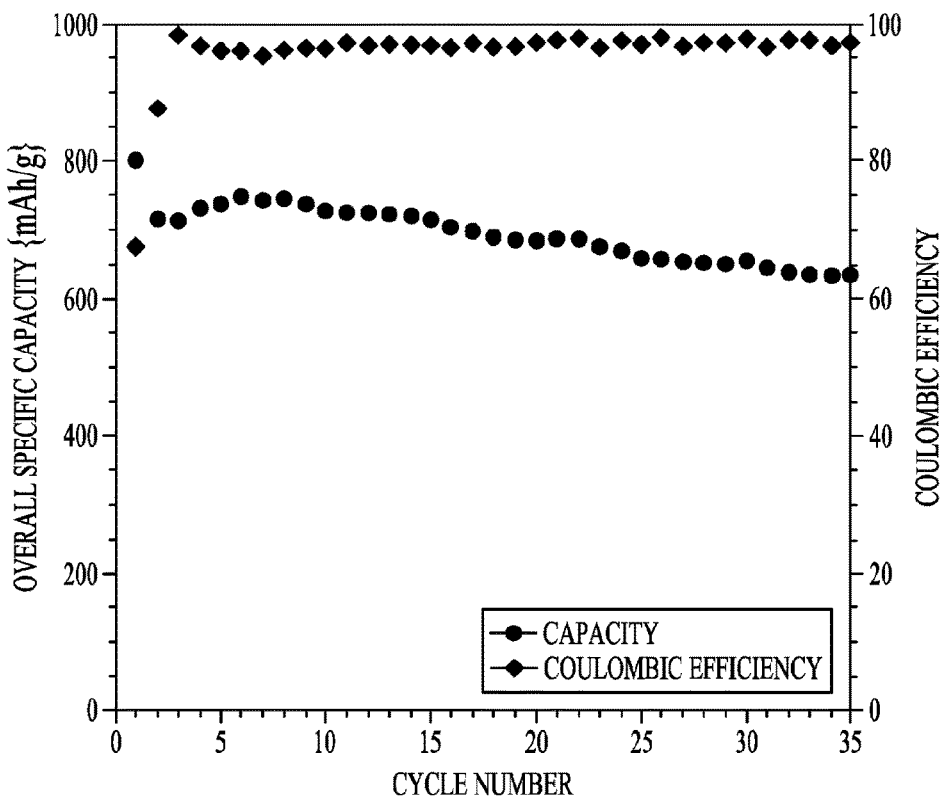
FIG. 6B shows additional electrical performance data of batteries using particles according to one example of the present disclosure.

The electrical performance of a sample of the $Li_2S$—C composite formed from using $LiNO_3$/sucrose precursors is shown in FIGS. 6A and 6B. The $Li_2S$—C composite was mixed with carbon black powder (conductive additive) and polyvinylidene fluoride (polymer binder) in N-methyl-2-pyrrolidone to form the electrode slurry. The weight percentages of $Li_2S$—C, carbon black, and polyvinylidene fluoride are 70%, 20% and 10%, respectively. The slurry was coated on an aluminum foil using a blade coater. The electrode was dried at room temperature for 24 hours followed by drying in a vacuum oven at 60° C. for overnight. A half cell with Li metal as the counter electrode was made in CR2032-type coin cells. For example, CR2032-type coin cells were then fabricated with the $Li_2S$—C composite as the working electrode, microporous polypropylene as the separator (Celgard 2300), and Li metal foil as the counter electrode.

The electrolyte used was 1 M lithium bis-(trifluoromethane)sulfonamide in tetraflyme. Cells were prepared in an Argon-filled VAC Omni-lab glovebox, and were tested from 1.5 to 3.5V on an Arbin BT2000. CV data was collected using a Gamry Interface 1000 analyzer with a scan rate of 0.1 $mVs^{-1}$.

FIG. 6A is the galvanostatic charge-discharge curve of the first two cycles of the Li2S—C composite. The first charge undergoes an activation process indicated by the overshot of the potential at 3.25 V and the higher plateau at 2.6 V. Following the activation in the first cycle, the $Li_2S$—C composite demonstrates typical Li—S reaction mechanisms. FIG. 6B illustrates the cycle stability. The $Li_2S$—C composite can retain a capacity of >600 mAh/g after 35 cycles with a current density of 56 mA/g (1/20 C).

The present disclosure provides a method that is distinctly different from all existing methods to produce $Li_2S$—C cathode materials for Li—S batteries. For example, the present disclosure provides a novel method using aerosol assisted spray pyrolysis process to synthesize $Li_2S$—C composites.

Figure 7:
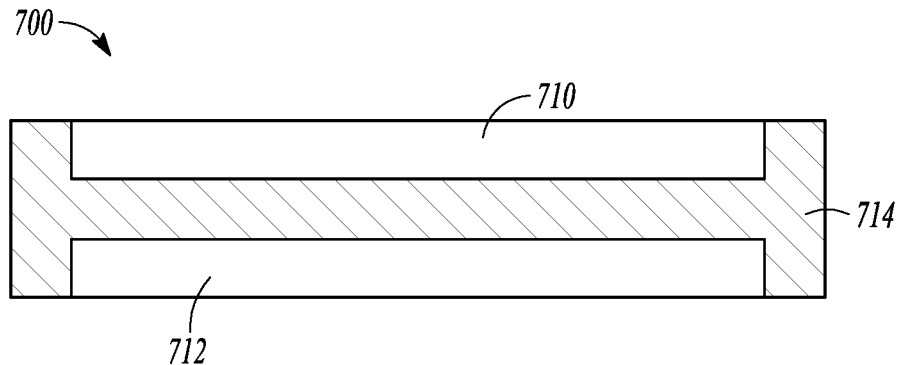
FIG. 7 shows a battery according to one example of the present disclosure.

FIG. 7 shows an example of a battery 700 according to an embodiment of the invention. The battery 700 is shown including an anode 710 and a cathode 712. An electrolyte 714 is shown between the anode 710 and the cathode 712. In one example, the battery 700 is a lithium-ion or lithium-sulfur battery. In one example, the cathode 712 can be the $Li_2S$—C composite as described in examples above and the anode 710 can be a non-lithium high-capacity anode material selected from tin and silicon based materials.

Figure 8:
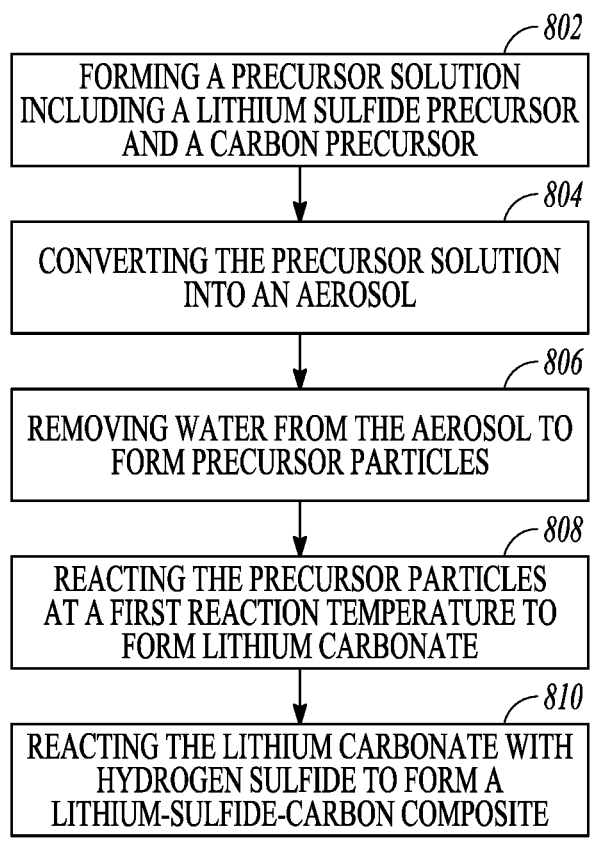
FIG. 8 shows a method of forming an electrode according to one example of the present disclosure.

FIG. 8 shows an example method of forming an electrode according to an embodiment of the invention. In operation 802 includes forming a precursor solution including a lithium sulfide precursor and a carbon precursor. In operation 804 includes converting the precursor solution into an aerosol. In operation 806 includes removing water from the aerosol to form precursor particles. In operation 808 includes reacting the precursor particles at a first reaction temperature to form lithium carbonate. In operation 810 includes reacting the lithium carbonate with hydrogen sulfide to form a lithium-sulfide-carbon composite.

Figure 9:
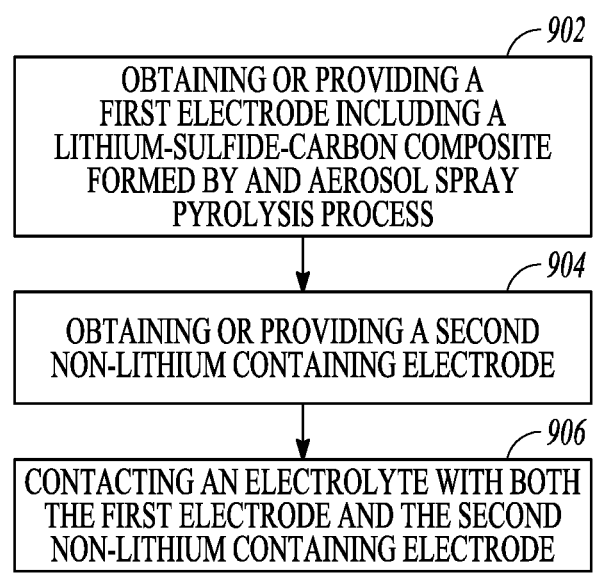
FIG. 9 shows a method of forming a battery according to one example of the present disclosure.

FIG. 9 shows an example method of forming a battery according to an embodiment of the invention. In operation 902 includes obtaining or providing a first electrode, including a lithium-sulfide-carbon composite formed by an aerosol spray pyrolysis process, wherein a plurality of lithium-sulfide particles are at least 70 weight percent of the electrode. In operation 904 includes obtaining or providing a second non-lithium containing electrode. In operation 906 includes contacting an electrolyte with both the first electrode and the second non-lithium containing electrode.

The lithium-sulfur (Li—S) battery has garnered increasing interest in recent years as a low cost, environmentally benign energy storage solution. Owing to its high theoretical capacity and low cost of materials, Li—S is well suited to a broad range of applications from smart grid system to electric vehicles. Though the Li—S chemistry is not new, scalable production of reliably performing batteries has eluded manufacturing efforts. A critical challenge of the Li—S cell is the solid-liquid-solid transition experienced by the sulfur during discharge/charge. While $S_8$ (fully charged cathode) and $Li_2S$ (fully discharged cathode) are insoluble in the electrolyte, the intermediate species, known as polysulfides, are soluble in organic electrolytes. The soluble species migrate through the electrolyte, eventually contacting the anode, where they reduce by reaction with available anode lithium in a process called the Polysulfide Shuttle. Eventually, the most soluble species reduce to less soluble species and deposit as $Li_2S$ on the anode surface. This Shuttle is responsible for an irreversible drop of capacity by loss of cathode material. The eventual passivation of the anode to the point of isolation dramatically raises internal cell resistance and effectively shuts down the cell. For a Li—S cell to function reversibly for hundreds of cycles these challenges must be addressed. Initial attempts involved the simple mixing of carbon with sulfur. While some improvement was offered, this mixing does not sufficiently entrap polysulfides, to prevent dissolution losses, nor did it ensure electrical contact for the bulk of the sulfur. A tailored carbon host particle emerged as a means of controlling the immediate environment of the sulfur in the cathode. Typical designs involve carbon rods as a sulfur deposition surface, high surface amorphous particles, nanotube mats or chemically linked carbon backbones. These techniques offered better electrical conductivity and greater utilization of sulfur, but nonetheless suffered severe capacity degradation, as they failed to account for dissolution losses. Later attempts focused on means of entrapping either the soluble or insoluble phases; these included reducing solubility by limiting the size of the sulfur species in tight channels, using polar functional groups to maintain an attraction to polysulfides and polymer coating of sulfur. While these techniques offer improvements in cycle stability and rate performance due to conductivity enhancements, they failed to deliver on the promise of a long cycle life. By producing a sulfur cathode, processing was limited by the melting point of sulfur and as such, only relatively low temperature techniques were accessible.

Recent work has highlighted the alternative approach of beginning with a prelithiated sulfur cathode, namely $Li_2S$. By structuring the cathode around $Li_2S$, rather than elemental $S_8$, the fully lithiated cathode is accounted for in the structure. By starting with a prelithiated $Li_2S$, the choice of anodes opens up to silicon (Si) a high capacity, non-lithium anode. A Si—$Li_2S$ cell offers a theoretical energy density of 1495 Wh/kg, nearly three times that of the state of the art lithium-ion, at 550 Wh/kg. Si—$Li_2S$ cells, lacking lithium metal anode obviates a key safety concern: catastrophic failure due to lithium dendrite growth. The techniques to produce $Li_2S$ based cathodes have included: simple mixing of $Li_2S$ with rubber, solution based layering of $Li_2S$ and carbon, followed by CVD, injection into an electrolyte system separated from the anode, reduction of $Li_2SO_4$ by graphene aggregates, reduced graphene oxide graphitization with $Li_2S_6$, polymerization of pyrrole around $Li_2S$ particles, carbonization of pyrrole around a $Li_2S$/carbon-black ball milled mix, reaction of $Li_2S$ with $TiCl_4$ to form a protective $TiS_2$ shell, spreading of $Li_2S$ powder into a CNT mat, agglomeration of dissolved $Li_2S$ onto MWCNTs. Common to the techniques cited, are the use of expensive materials or process steps. While tailoring the cathode to the lithiated state has shown improvements in terms of cycle stability and sulfur utilization, the processes discussed remain unreasonable for scale-up. As such, the ideal production method would leverage simpler starting materials and avoid expensive reaction steps.

In this work we show that the challenges of the sulfur cathode, electrical and ionic insulation as well as polysulfide dissolution can be addressed by the arrangement of the active cathode material inside amorphous carbon confinement, accomplished with the simple, scalable, manufacturing technique of Aerosol Spray Pyrolysis (ASP). In this method, ASP is first used to generate composite particles of dispersed lithium carbonate within amorphous carbon ($Li_2CO_3@C$). Lithium carbonate is formed with one of the following precursors: lithium acetate ($CH_3COOLi$), lithium nitrate ($LiNO_3$) or lithium carbonate, all of which yield $Li_2CO_3$ under identical reaction conditions. Sucrose or polyvinylpyrrolidone (PVP, MW 55,000) are used as carbon precursors, both of which yield a carbon host under identical reaction conditions. The $Li_2CO_3@C$ composite is post-treated to yield a $Li_2S@C$ composite using mixed hydrogen sulfide/argon gas ($H_2S/Ar$ at 5/95 vol. %) at elevated temperature. We show that the ASP method can be used to generate the $Li_2CO_3@C$ composite from various water-soluble precursors. The selection of precursors has an impact on particle morphology, and as such on performance.

Methods

ASP System

Figure 10:
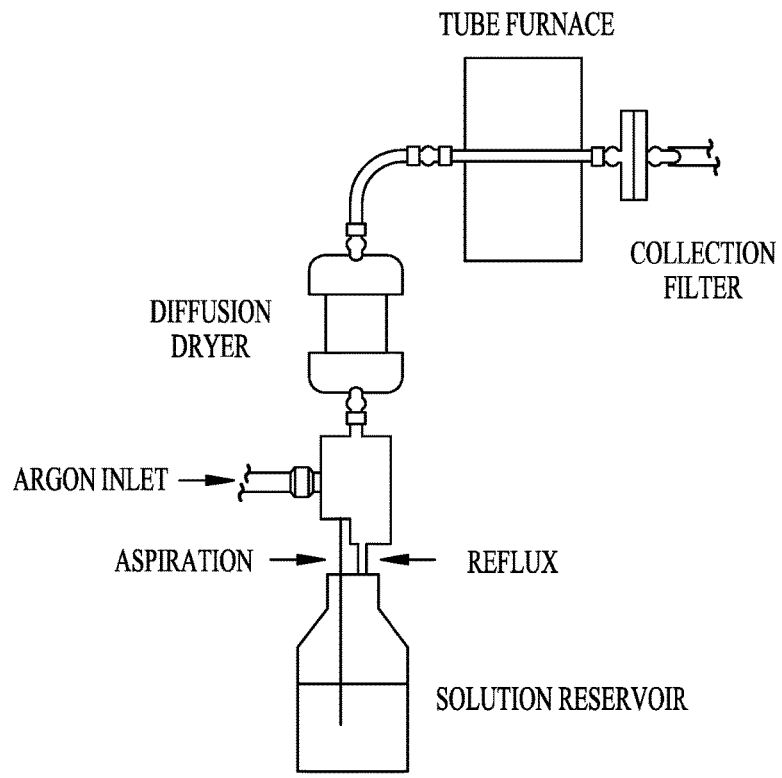
FIG. 10 shows components of a an aerosol spray pyrolysis (ASP) system according to one example of the present disclosure.

The precursor solution (listed in Table 1) is thoroughly mixed via stir plate until no precipitates are visible, then loaded into the nebulizer reservoir bottle. As illustrated in FIG. 10, the nebulizer (TSI, Model 3076) is attached to the bottom of a diffusion dryer, then connected to the precursor solution reservoir. The diffusion dryer is composed of two concentric tubes: The outer tube is made of solid PVC tubing and the inner tube is made of ½" diameter steel mesh (Specialty Metals Inc.). The annular space is filled with porous silica gel to desiccate the water content from the aerosol of the precursor solution, as it passes through the diffusion dryer in an argon carrier stream. The resultant dried particles are carried through a quartz tube (½" OD, GM & Associates) through a tube furnace (61 cm heated length, Thermo-Scientific) connected to the diffusion dryer, in which $Li_2CO_3@C$ formation occurs at 850° C. A steel mesh filter (304SS, 325*2300 mesh, McMaster Carr) is attached to the end of the quartz tube via ultra-torr fittings (Swagelok).

$Li_2CO_3@C$ Synthesis

A lithium salt and a carbon precursor are added to 240 ml of Ultra-Pure deionized water (Millipore), in concentrations articulated in the table below.

TABLE 1

Precursor combinations and optimized concentrations thereof.

| Designation | Lithium Salt | Conc. [M] | Carbon Precursor | Conc. [M] |
|---|---|---|---|---|
| AceS | Acetate | 0.30 | Sucrose | 0.020 |
| AceP | Acetate | 0.30 | PVP | 0.250 |
| CarS | Carbonate | 0.10 | Sucrose | 0.085 |
| CarP | Carbonate | 0.04 | PVP | 0.280 |
| NitS | Nitrate | 0.30 | Sucrose | 0.250 |
| NitP | Nitrate | 0.30 | PVP | 0.150 |

Figure 11:
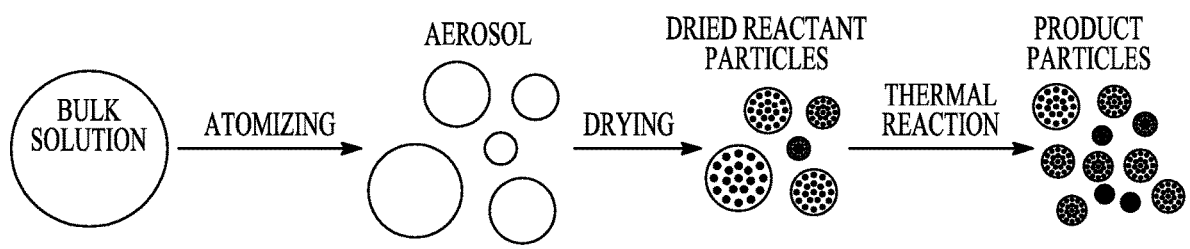
FIG. 11 shows a diagram of an ASP process according to one example of the present disclosure.

For all compositions, the pyrolysis environment drives a carbonization of the carbon precursor, as aided by the salt nucleates. Without an appropriate nucleate the carbon precursor decomposes entirely. Exposure to a pyrolysis environment yields crystalline $Li_2CO_3$ from all three initial salts, as is discussed in the Characterization section. Amorphous carbon is generated by the decomposition of the carbon precursor, catalyzed by the $Li_2CO_3$ nucleates. FIG. 11 illustrates the evolution of aerosol droplet, from bulk solution to $Li_2CO_3@C$ composite particle.

FIG. 11—Aerosol particle evolution. Bulk solution in the reservoir is aspirated into the nebulizer, where it is aerosolized by the argon carrier gas feed. Drying begins in the diffusion dryer and completes in the heated zone. Lithium salt and carbon precursor carbonization proceed in the heated zone. $Li_2CO_3@C$ composite particle is then collected on a mesh filter.

Figure 12:
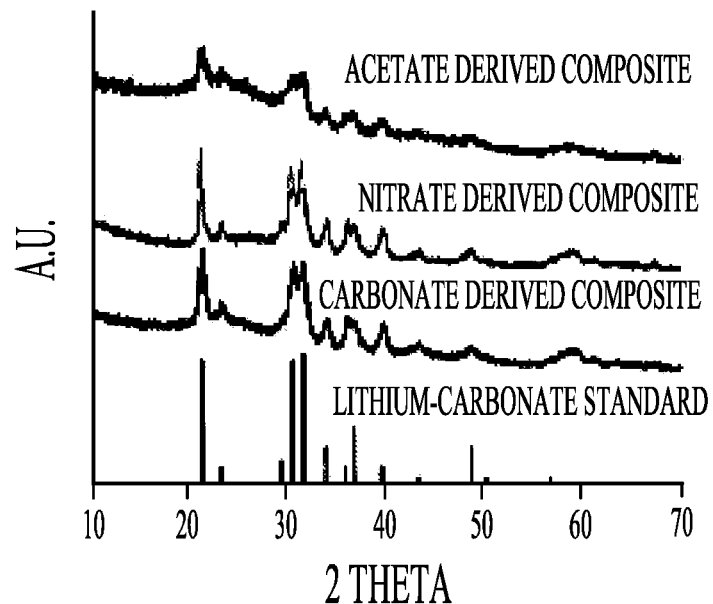
FIG. 12 shows x-ray diffraction data of materials formed according to one example of the present disclosure.

Characterization of the crystalline species in the composite is done via X-Ray Diffraction (XRD), with a PANalytical Empyrean. FIG. 12 details scans of the pyrolysis product of all three salt precursors, confirming the evolution of all three salts to lithium carbonate. For the CarS and CarP solutions, the final crystalline product is $Li_2CO_3$. This indicates that $Li_2CO_3$ serves as catalyst for carbon formation from sucrose and PVP during ASP. For the NitS and NitP solutions, thermal decomposition of lithium nitrate in the pyrolysis environment proceeds as follows (Stern, High Temperature Properties and Decomposition of Inorganic Salts; Part 3. Nitrates and Nitrites, 1972),

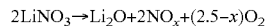

X-ray diffraction observations consistently show the presence of $Li_2CO_3$, with no evidence of either $LiNO_3$ or $Li_2O$. Suggesting a source of $CO_2$, such as the oxidation of carbon by the evolved oxygen,

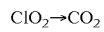

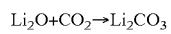

For the AceS and AceP solutions, lithium acetate experiences the following thermal decomposition (Roe & Finlay, 1952),

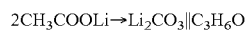

Figure 13:
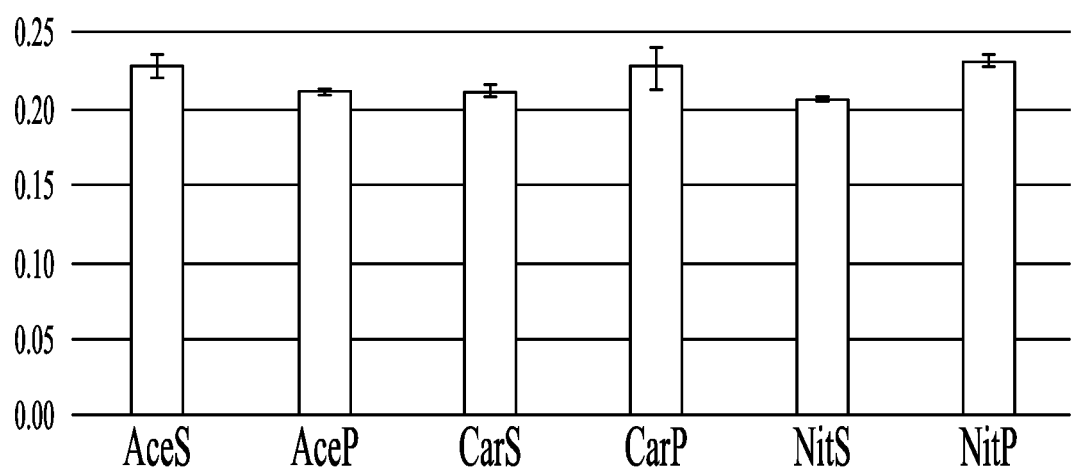
FIG. 13 shows carbon content of materials formed according to one example of the present disclosure.

Mass loading of carbon within the composite is measured via thermogravimetric analysis with a Q500 TGA (TA Instruments Inc). Samples are held at a 120° C. plateau to remove the moisture absorbed from environment. The sample is then ramped to 600° C. at 10° C. per minute. 600° C. is held for an hour. At this point the carbon content has oxidized, and the remaining mass can be taken as $Li_2CO_3$. All compositions were standardized to a range of 20-25% carbon content in the pyrolysis material as shown in FIG. 13, so as to eliminate carbon content as a significant variable in cell performance. As shown in FIG. 13, TGA analysis of carbon content. A narrow range of 20-25% carbon was selected to reflect a realistic compromise for all six compounds, and offer a robust comparison, where carbon loading in and of itself is not a variable. A fully optimized composite is likely to require less carbon.

Figure 14:
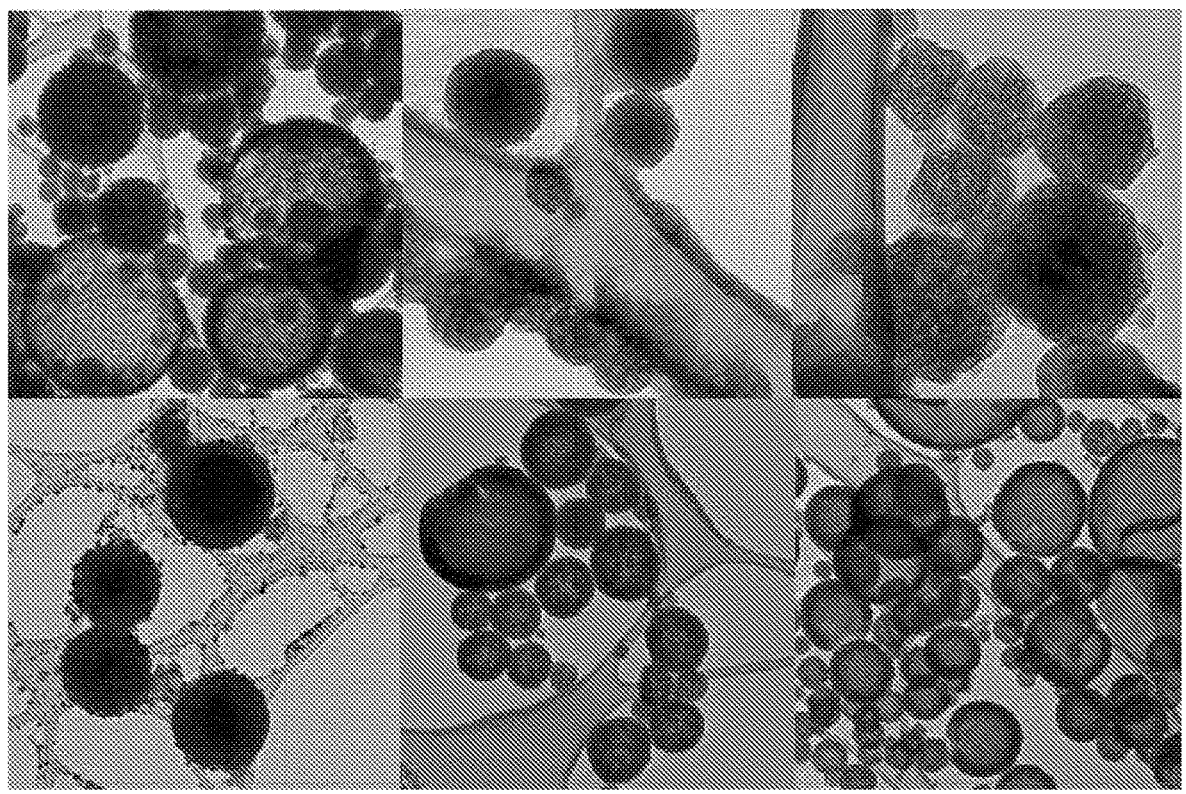
FIG. 14 shows images of materials formed according to one example of the present disclosure.

Assessment of the composite structure is done via TEM imaging with a Tecnai T12. FIG. 14 articulates the varying architectures achieved by different precursor sets, at similar carbon loadings. FIG. 14 shows, from top left, Li2CO3@C particles of the following compositions: AceS, AceP, CarS, CarP, NitS, NitP.

Conversion to $Li_2S@C$

The resulting $Li_2CO_3@C$ composite is placed in a ceramic boat in a tube furnace (OTF-1200X, MTI). The reaction environment is purged for an hour in argon, heat is ramped up over forty minutes and maintained at 725° C. for 5 hours under a flow of 5% $H_2S$/95% argon. Due to the sensitivity to moisture of the $Li_2S$@C composite, collection of product powder is achieved in a glovebag (Sigma Aldrich), which is vacuumed and argon purged three times before opening the reaction vessel and colleting the powder into a scintillation vial. The vial is quickly removed and placed in an argon filled glovebox, for electrode preparation. The XRD in FIG. 15 indicated the conversion of $Li_2CO_3$ to $Li_2S$ based on following reaction:

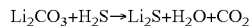

$$Li_2CO_3 + H_2S \rightarrow Li_2S + H_2O + CO_2$$

Figure 15:
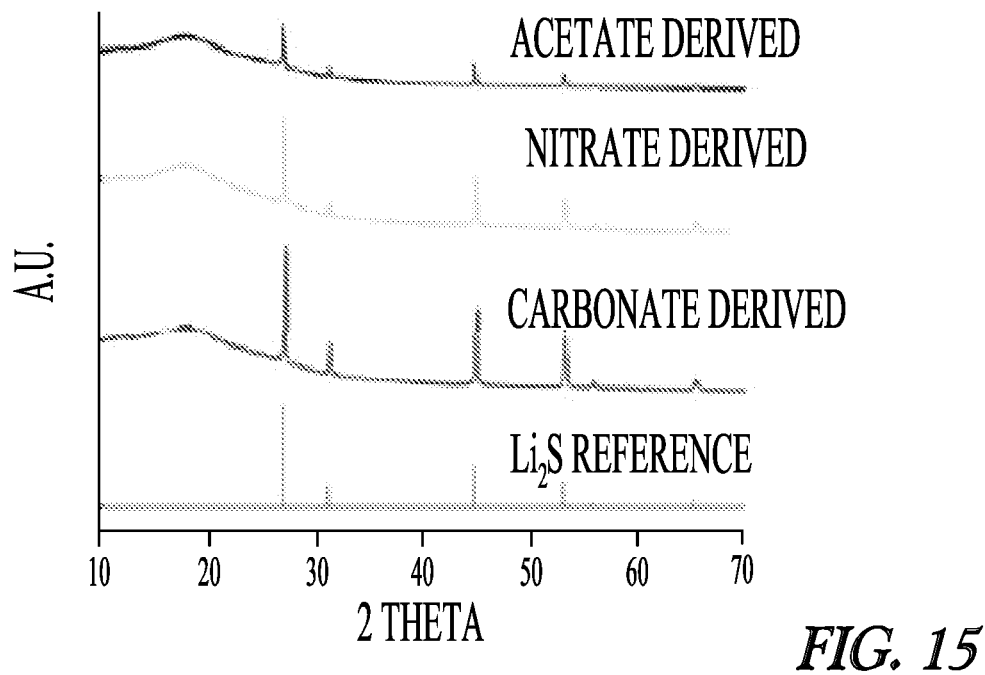
FIG. 15 shows x-ray diffraction data of materials formed according to one example of the present disclosure.

FIG. 15 shows XRD of $Li_2S$@C composite particles.

Cathode Preparation and Cell Assembly

Figure 16:
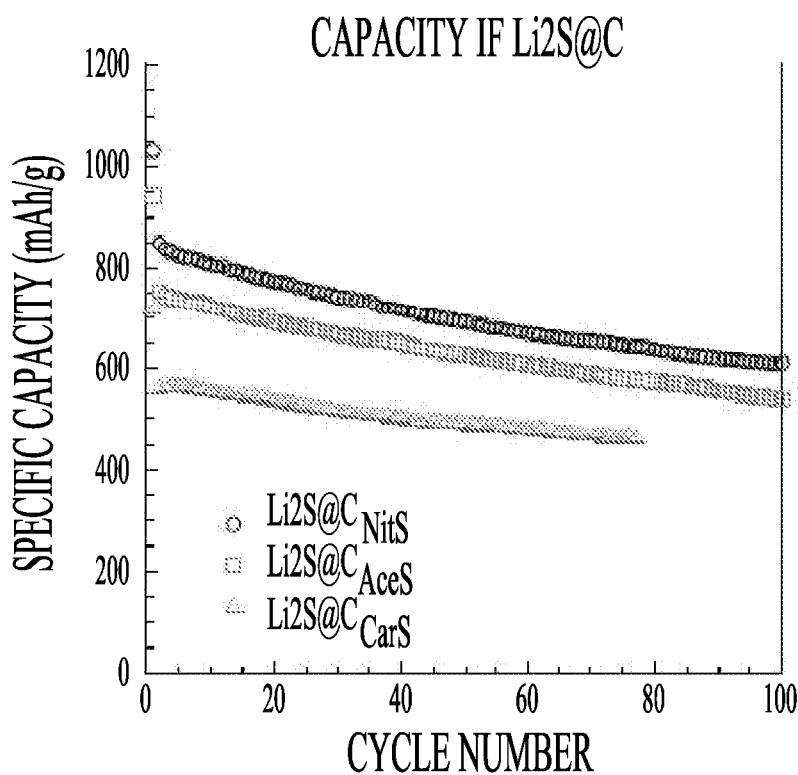
FIG. 16 shows graphs of electrical properties of electrodes according to one example of the present disclosure.

The $Li_2S$@C composite is mixed with 3.33 wt. % Polystyrene solution in Mesitylene (Sigma Aldrich) and conductive carbon (C65, Timcal) additive in a 70/20/10 mass ratio ($Li_2S$@C/conductive carbon/polystyrene). The resulting paste is spread on a carbon coated aluminum foil (MTI) current collector. The cathode foil is dried overnight in an argon filled glovebox at room temperature, punched with a ½" hole punch then held at 120° C. for four hours, in argon, to ensure that the electrodes are solvent free. The dried electrodes are assembled into a 2032 coin cell. The anode is a lithium foil (99.9%, Alfa Aesar), the separator is a porous polypropylene membrane (MTI XTL Inc.) and the electrolyte is a 1M LiTFSI solution of 1:1:2 by vol. mixture of dioxolane (Sigma Aldrich), dimethyl ether (Sigma Aldrich) and 1-Butyl-1-methylpyrrolidinium bis(trifluoromethanesulfonyl)imide with 1.5 wt. % $LiNO_3$ (Sigma Aldrich). Battery cycling was done in a battery cycler (Arbin). The first cycle is run at a rate of C/50 (23.3 mA/g based on $Li_2S$) to a cutoff of 3.5V to 1.8V. Subsequent cycles are run at C/10 between 2.6V and 1.8V. FIG. 16 shows the capacity of $Li_2S$@C from precursors of NitS, AceS and CarS, denoted as $Li_2S@C_{NitS}$, $Li_2S@C_{AceS}$ and $Li_2S@C_{CarS}$, respectively.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

Additional Notes

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "substantially simultaneously" or "substantially immediately" or "substantially instantaneously" refers to events occurring at approximately the same time. It is contemplated by the inventor that response times can be limited by mechanical, electrical, or chemical processes and systems. Substantially simultaneously, substantially immediately, or substantially instantaneously can include time periods 1 minute or less, 45 seconds or less, 30 seconds or less, 20 seconds or less, 15 seconds or less, 10 seconds or less, 5 seconds or less, 3 seconds or less, 2 seconds or less, 1 second or less, 0.5 seconds or less, or 0.1 seconds or less.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of forming a battery electrode, comprising:
   forming a precursor solution including a lithium sulfide precursor and a carbon precursor;
   converting the precursor solution into an aerosol;
   removing water from the aerosol to form precursor particles;
   reacting the precursor particles at a first reaction temperature to form a lithium carbonate-carbon composite; and
   reacting the lithium carbonate-carbon composite with hydrogen sulfide to form a lithium-sulfide-carbon composite.

2. The method of claim 1, further including shaping an amount of the lithium-sulfide-carbon composite into an electrode.

3. The method of claim 1, wherein the lithium sulfide precursor is selected from lithium nitrate, lithium acetate, and lithium carbonate.

4. The method of claim 1, wherein the carbon precursor is selected from sucrose, glucose, and polyvinylpyrrolidone.

5. The method of claim 1, wherein the lithium sulfide precursor is lithium nitrate and the carbon precursor is sucrose.

6. The method of claim 1, wherein the lithium sulfide precursor is lithium acetate and the carbon precursor is sucrose.

7. The method of claim 1, wherein the lithium sulfide precursor is lithium acetate and the carbon precursor is sucrose.

8. The method of claim 1, wherein the lithium-sulfide-carbon composite includes about 50 volume percent to about 65 volume percent of lithium sulfide.

9. The method of claim 1, wherein the precursor particles have a water content of less than 20 percent.

10. The method of claim 1, wherein reacting the lithium carbonate with hydrogen sulfide includes reacting the lithium carbonate with hydrogen sulfide at a second temperature in a gaseous environment including an inert gas an hydrogen sulfide, wherein the second temperature less than the first temperature.

11. The method of claim 10, further including forming the gaseous environment.

12. The method of claim 11, wherein forming the gaseous environment including flowing argon and hydrogen over elemental sulfur.

13. An electrode, comprising:
    a plurality of lithium sulfide composite particles, wherein individual lithium sulfide composite particles include;
    a carbon matrix; and
    a plurality of lithium-sulfide particles uniformly distributed into the carbon matrix, wherein multiple lithium sulfide particles are contained within a continuous carbon matrix.

14. The electrode of claim 13, wherein the plurality of lithium particles are uniformly distributed into the carbon matrix via an aerosol spray pyrolysis process such that per one gram of carbon includes lithium-sulfide particles within the range of about 1 gram to about 2.5 grams.

15. A battery, comprising:
    a first electrode, including:
    a plurality of lithium sulfide composite particles, wherein individual lithium sulfide composite particles include a plurality of lithium-sulfide particles in a carbon matrix, wherein multiple lithium sulfide particles are contained within a continuous carbon matrix;
    a second electrode; and
    an electrolyte in contact with both the first electrode and the second electrode.

16. The battery of claim 15, wherein the carbon matrix include an amorphous carbon matrix.

17. The battery of claim 15, wherein the plurality of lithium-sulfide particles are about 70 weight percent of each lithium sulfide composite particle.

18. The battery of claim 15, wherein the plurality of lithium particles are uniformly distributed within lithium sulfide composite particles via an aerosol spray pyrolysis process such that per one gram of carbon includes lithium-sulfide particles within the range of about 1 grain to about 2.5 grams.

* * * * *